(12) United States Patent
Childress et al.

(10) Patent No.: US 10,184,635 B2
(45) Date of Patent: Jan. 22, 2019

(54) LIGHT DEVICE

(71) Applicant: VARROC LIGHTING SYSTEMS, s.r.o., Senov u Noveho Jicina (CZ)

(72) Inventors: Colby J. Childress, Novi, MI (US); Timothy Pelech, Almont, MI (US)

(73) Assignee: VARROC LIGHTING SYSTEMS, S.R.O., Senov u Noveho Jicina (CZ)

( * ) Notice: Subject to any disclaimer, the term of this patent is extended or adjusted under 35 U.S.C. 154(b) by 0 days.

(21) Appl. No.: 15/332,344

(22) Filed: Oct. 24, 2016

(65) Prior Publication Data

US 2018/0112847 A1 Apr. 26, 2018

(51) Int. Cl.
| | |
|---|---|
| *F21V 9/00* | (2018.01) |
| *F21S 43/239* | (2018.01) |
| *F21S 41/24* | (2018.01) |
| *F21S 43/245* | (2018.01) |
| *F21V 8/00* | (2006.01) |
| *F21S 43/14* | (2018.01) |
| *F21S 43/237* | (2018.01) |
| *F21S 43/247* | (2018.01) |

(52) U.S. Cl.
CPC .............. *F21S 43/239* (2018.01); *F21S 41/24* (2018.01); *F21S 43/14* (2018.01); *F21S 43/237* (2018.01); *F21S 43/245* (2018.01); *F21S 43/247* (2018.01); *G02B 6/0038* (2013.01); *G02B 6/0053* (2013.01); *G02B 6/0065* (2013.01); *G02B 6/001* (2013.01); *G02B 6/003* (2013.01)

(58) Field of Classification Search
CPC .......................... F21S 48/2225–48/2293; F21S 43/236–43/251; B60Q 1/0011; B60Q 3/62–3/64
See application file for complete search history.

(56) References Cited

U.S. PATENT DOCUMENTS

| | | | |
|---|---|---|---|
| 7,699,511 | B2 | 4/2010 | Kawaji et al. |
| 2009/0284365 | A1 | 11/2009 | Wagner et al. |
| 2012/0147614 | A1 | 6/2012 | Schmierer |

FOREIGN PATENT DOCUMENTS

| | | |
|---|---|---|
| DE | 29702746 U1 | 4/1997 |
| DE | 19831002 A1 | 4/2000 |

(Continued)

OTHER PUBLICATIONS

Official Letter from the German Patent and Trademark Office for German Application No. 102017123669.4; dated Jun. 6, 2018; 14 Pages.

*Primary Examiner* — Sean Gramling
(74) *Attorney, Agent, or Firm* — Cantor Colburn LLP

(57) ABSTRACT

A lighting device includes a housing, the housing comprising an opening. The lighting device also comprises a lens operably disposed in the opening, the lens having an outer viewable face and an opposed inner face, the lens comprising an integrally formed axially-extending light guide, the light guide comprising a light inlet end, a light outlet comprising a portion of the outer viewable face, and a light transmission portion, the light transmission portion comprising a light reflecting structure disposed on the inner face. The lighting device also includes a light source, the light guide configured to receive light rays from the light source into the light inlet end, transmit the rays via internal reflectance along light transmission portion to the light reflecting structures where they are reflected outwardly away from the lighting device in a principal direction through the outer viewable face.

13 Claims, 9 Drawing Sheets

(56) References Cited

FOREIGN PATENT DOCUMENTS

| | | |
|---|---|---|
| DE | 102012211822 A1 | 5/2018 |
| EP | 1657111 A2 | 5/2006 |
| WO | 2015075668 A1 | 5/2015 |

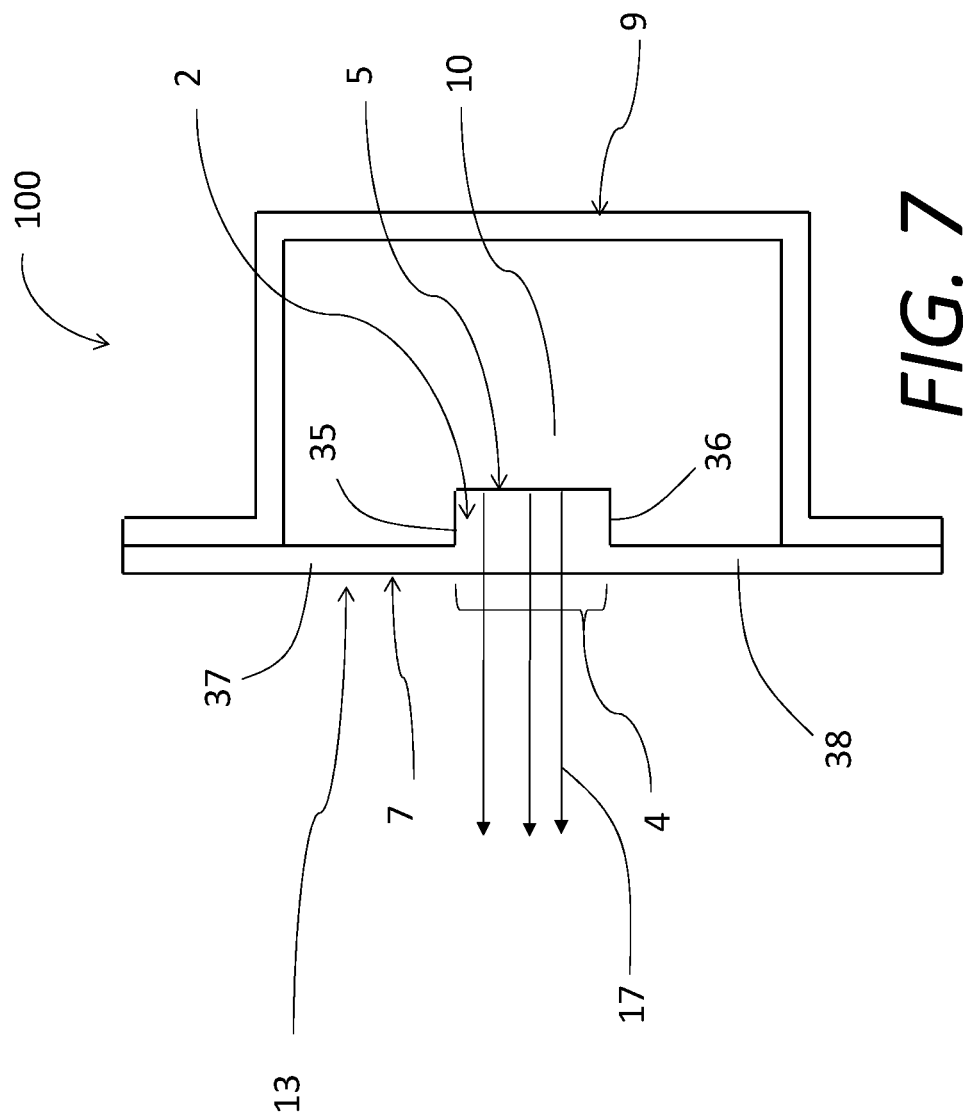

LIGHT DEVICE

TECHNICAL FIELD

The invention relates to a new light device for motor vehicles comprising an LED light source and an elongated light guide.

BACKGROUND OF THE INVENTION

In the field of lighting technology, light emitting diodes, referred to with the abbreviation LED, are frequently used as a light source instead of the conventional halogen bulbs. Among the lights of motor vehicles light guides occupy a special position as their elongated shape makes them especially suitable to create light lines positioned along the outline of headlights, or separately to create warning lights, e.g. positional, brake, indicator, or daily orientation lights. At present, light guides often fulfill signal light functions subject to higher requirements for the luminous flux, e.g. the day-time running lamps in headlights and the rear brake and direction indication lights in the rear lamps. Sometimes they are used where a bright, uniform appearance for the side repeater, which is incorporated into the side mirror, is requested.

The document U.S. Pat. No. 7,699,511 describes a turn lamp with a base housing; a light source unit incorporated with a light source, e.g. LED, and housed in the base housing; an inner housing has a long and solid light guide; and a lens cover covers the base housing. A diffused reflection generator is structured such that light from the light source leaks out from the light guide. The light source is arranged at a longitudinal end portion of the light guide. The base housing has a body portion that is integrally molded from a non-translucent resin material. A disadvantage of this design is that it requires a relatively thick packaging space to accommodate the lens cover and several light sources to achieve a uniform appearance.

The document EP1657111 discloses a lamp with an optical fiber, including a set of deflecting structures, which deflects light that falls on the structures in such a manner that the light comes out of a front side of the optical fiber. A set of optically operative structures is arranged over a length of the optical fiber and a part of the remaining light is emitted in angular areas extending transverse to a driving direction.

A disadvantage of this design is that it still requires a secondary lens to act as an outer lens to protect the light guide. This increases the required packaging space and requires an additional molded part for the exterior lens.

The document US20090284365 discloses a light module having visible-light emitting light source, e.g. LED, coupled to one of a set of light guiding elements and an infrared light emitting light source coupled to one of the light guiding elements. A major portion of a longitudinal extension between ends and opposite ends, respectively of the light guiding elements, follows an outer contour. The light guiding elements emit light along the major portion of the longitudinal extensions. The light sources are coupled to the light guiding elements.

As shown in FIG. 2b, this design does not include any method to protect the optical elements from the environment and will require an additional outer lens to protect the optical surfaces. Additionally, this design does not address a method for extracting light from the guides.

The technical solutions mentioned above all require an exterior lens to protect the optical system, generally a light guide. This requires significant packaging space for the lamp, which is not available in certain applications. Many lamps, particularly; side repeaters, side mounter turn signals, and applique lamps; have very narrow packaging space requirements, which makes it difficult and in some cases not possible to fit a light guide and an outer lens with an air gap between. In the prior designs, a number of optical systems are known where an indirect reflector is used behind either a grained/textured or volumetric-diffusing lens with a narrow area in between individual reflector segments. Alternatively, a light guide may be used in place of an indirect reflector. For a truly homogeneous appearance, two diffuser lenses are needed. One of the diffusers may also be the outer lens. This type of design is also undesirable for the applications mentioned because it requires too much package space because space is required for multiple lenses as well as clearance spaces to account for variations in assembly and molding.

Therefore, it is very desirable to provide a light device that overcomes the shortcomings and disadvantages of the previous light designs noted above.

SUMMARY OF THE INVENTION

A lighting device, including a vehicular lighting device, is disclosed. The lighting device includes a housing, the housing comprising an opening. The lighting device also comprises a lens operably disposed in the opening, the lens having an outer viewable face and an opposed inner face, the lens comprising an integrally formed axially-extending light guide, the light guide comprising a light inlet end, a light outlet comprising a portion of the outer viewable face, and a light transmission portion, the light transmission portion comprising a light reflecting structure disposed on the inner face. The lighting device also includes a light source, the light guide configured to receive light rays from the light source into the light inlet end, transmit the rays via internal reflectance along light transmission portion to the light reflecting structures where they are reflected outwardly away from the lighting device in a principal direction through the outer viewable face.

The present light device eliminates the shortcomings and disadvantages of the prior art light devices in two principle ways. Previous designs require separately molded interior light guide part and an exterior lens part for either light manipulation and/or protecting the interior light guide from environmental factors. First, the present invention advantageously eliminates the need for a separately molded exterior lens and interior light guide and by extension eliminates the need for a separate mold tool and molding operation. Second, the present invention advantageously significantly reduces the amount of packaging space needed for a light guide function by combining the outer lens and the light guide into a single item. A traditional system would require 2-3 mm for the outer lens and 4-10 mm for the light guide with at least 2-5 mm of clearance space for a total thickness of 8-18 mm. In one embodiment, the present light device would eliminate the clearance space and combine the lens thicknesses giving a total thickness of 4-10 mm, and in certain embodiments 4 mm to less than 8 mm, and 4 mm to 7.5 mm.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 7 is a lateral cross section view of the embodiment of the light device of FIG. 6 comprising a vehicular rear lamp in which the light emitting surface is flush to an outer lens and attaches directly to the other elements of the lighting device

DETAILED DESCRIPTION

Figure 1:
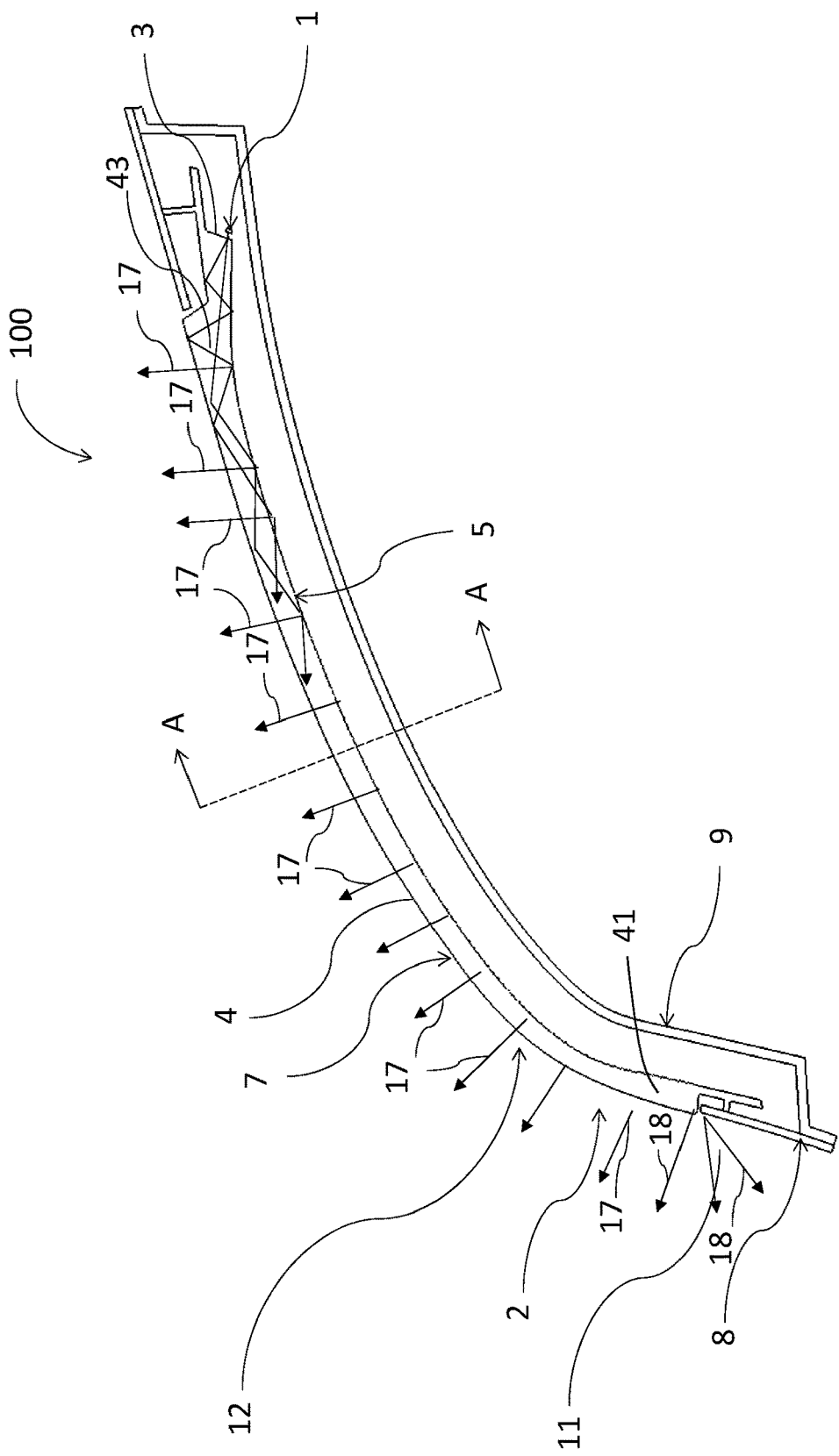
FIG. 1 is a first longitudinal sectional view of an embodiment of the light device as disclosed herein.

Referring now to the Figures, where the invention will be described with reference to specific embodiments, without limiting same, the light or lighting device 100 in accordance with the invention is explained with the use of drawings. The light device 100 may be employed in any suitable application or design, including as a light device 100 for various vehicles or in various vehicular applications, particularly in all manner of automotive vehicles. In one embodiment, the lighting device 100 comprises a vehicular exterior lighting device or a vehicular interior lighting device. In one embodiment, a vehicular exterior lighting device comprises a side mirror light, a tail light, a parking light, a running light, or a head light. FIG. 1 shows a longitudinal section view of the light guide 2 in which the exit face or surface 4 for emission of light rays 17 is combined with outer lens 7. The ends of the lens 7/light guide 2 as well as the light source 1 and optical in-coupling area or light inlet end 3 are hidden behind an outer cover or housing 8, typically comprising a fascia or a bezel. In one embodiment, the outer lens 7 is curved or flat, and in another embodiment the lens is clear or colored. The cover or housing 8 is opaque in the arrangement shown but may also be translucent or transparent. The housing comprises an opening 19 and the lens 7/guide 2 is operably disposed in the opening. Other backing structure elements 9 of the lamp or vehicle, such as sheet metal or other components such as those that define an inner cover, may optionally reside behind the light guide 2. The light guide 2 may be made from any suitable optical lightguide material, and in certain embodiments is made of either polycarbonate (PC) or polymethyl methacrylate (PMMA), preferably of crystal quality, due to the favorable optical and mechanical properties of these materials.

Figure 2:
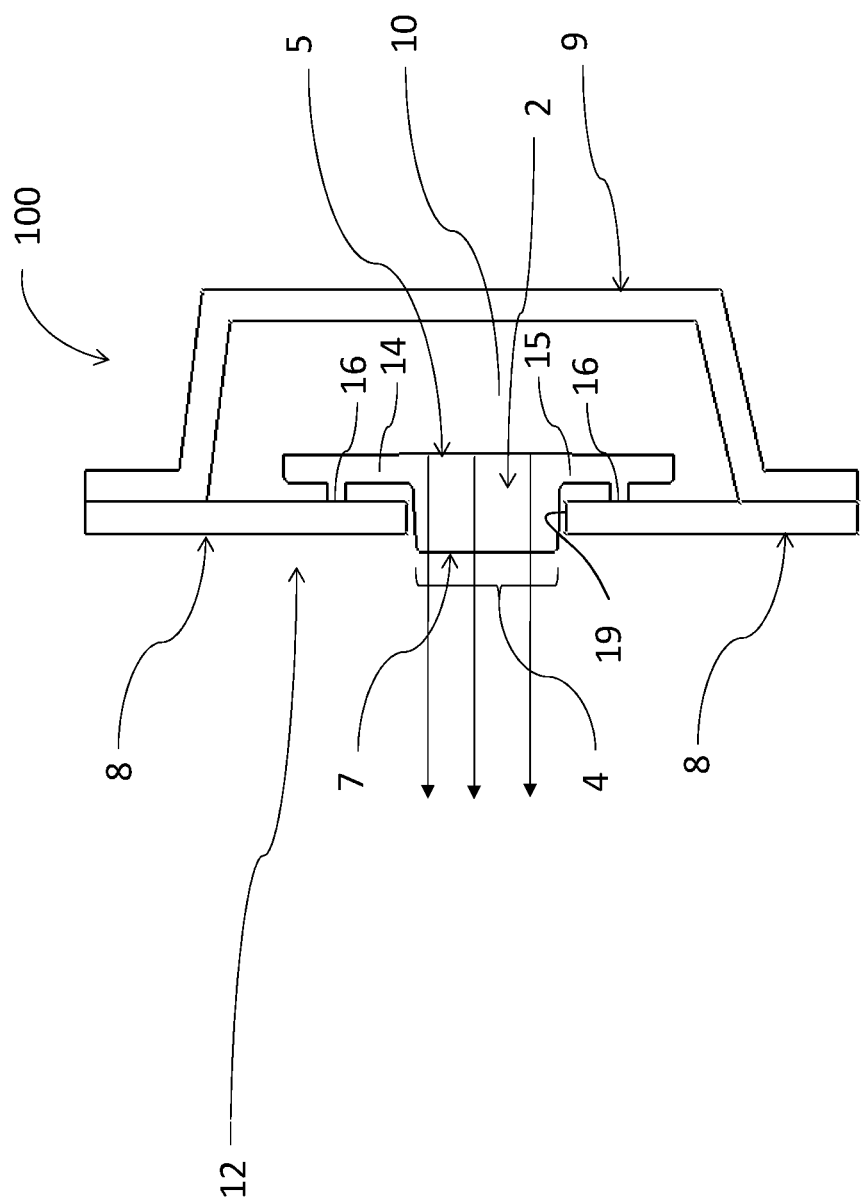
FIG. 2 is second lateral sectional view of the embodiment of the light device of FIG. 1 taken generally perpendicular to FIG. 1 along section A-A.

FIG. 2 shows a cross section view of the parts of the light guide 2 with the outer lens 7. The upper 14 and lower 15 portions of the lens are hidden behind the opaque cover 8 and would act as the attachment features for the light guide 2. FIG. 2 shows an application using vibration or infrawelding to provide attachments 16 as weld joints, but any other suitable attachment scheme or fastening mechanism to provide attachments 16 for attaching the light guide 2, such as various fasteners, glues, or hot-plate welting would be acceptable. Other backing structure elements 9 of the lamp or vehicle, including interior mirror mechanical elements in this arrangement, reside behind the lamp with the bulk of the light guide 2 in the packaging space 10 or cavity between them.

Figure 3A:
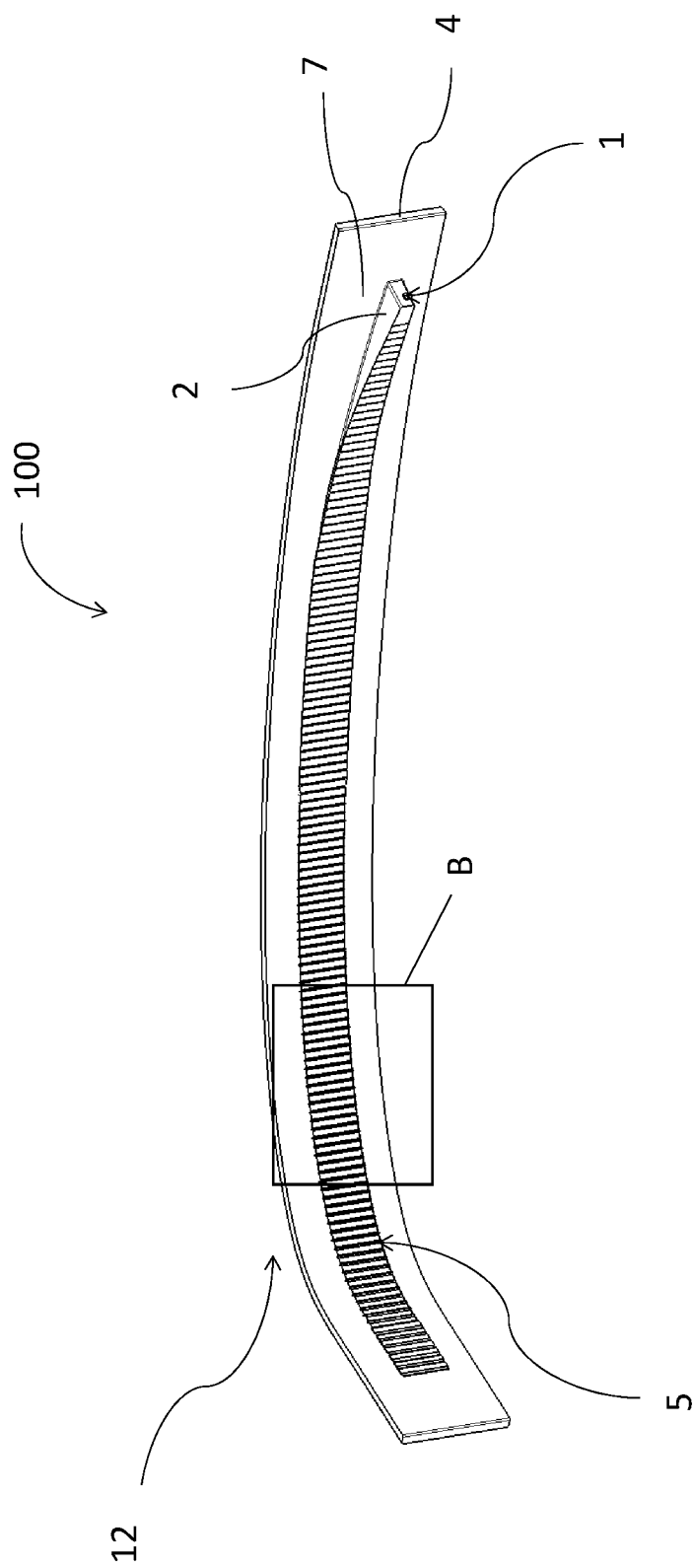
FIG. 3A is a perspective view of an embodiment of a prismatic face on the back side of an embodiment of the light guide of FIG. 1 as disclosed herein.
Figure 3B:
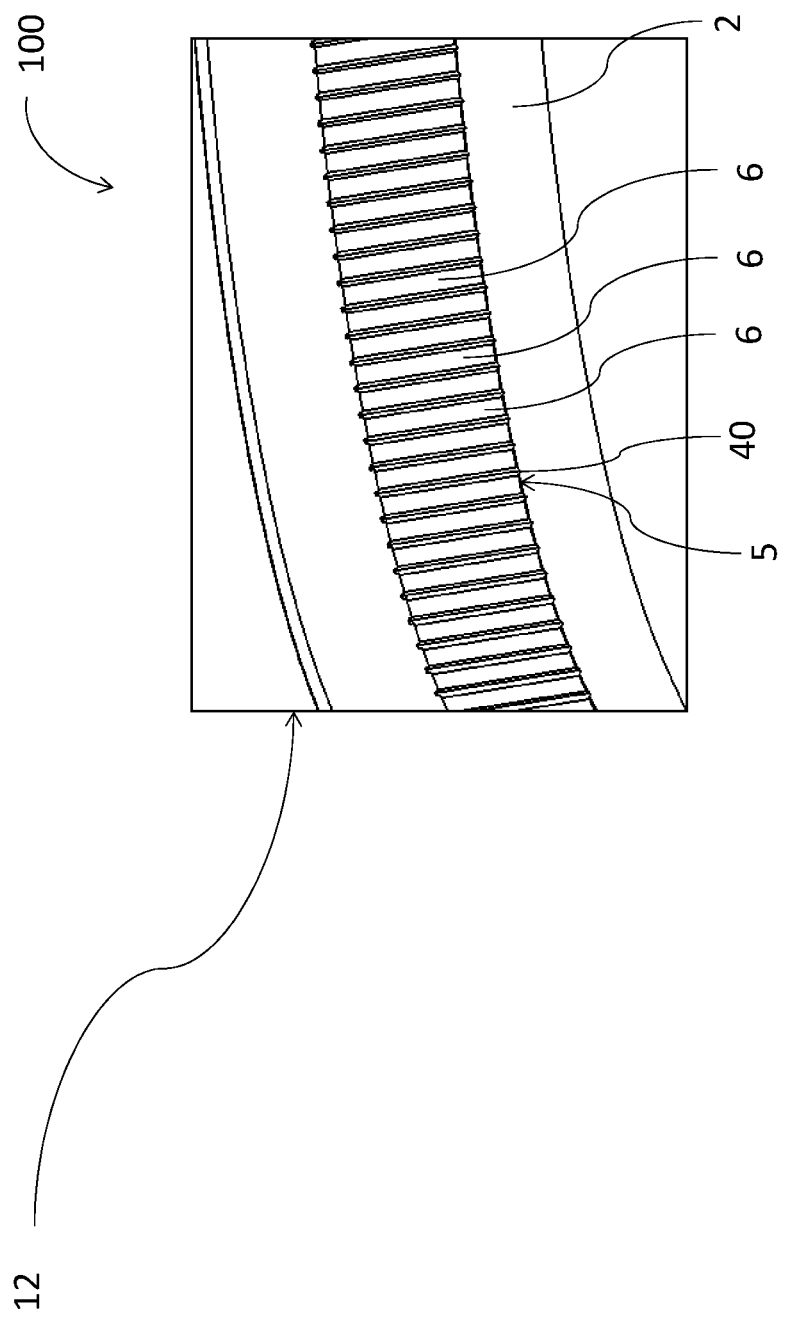
FIG. 3B is an enlargement of region B of FIG. 3A.

FIGS. 3A and 3B show a plurality of prismatic faces 5 disposed on the back side of the light guide 2. These prismatic faces 5 are disposed between totally internal reflecting areas 6 on the back of the light guide 2 and eject light from them outwardly from the light guide through the exit face 4 or surface. Light from the source 1 enters through the in-coupling area 3 into the light guide 2.

Figure 4A:
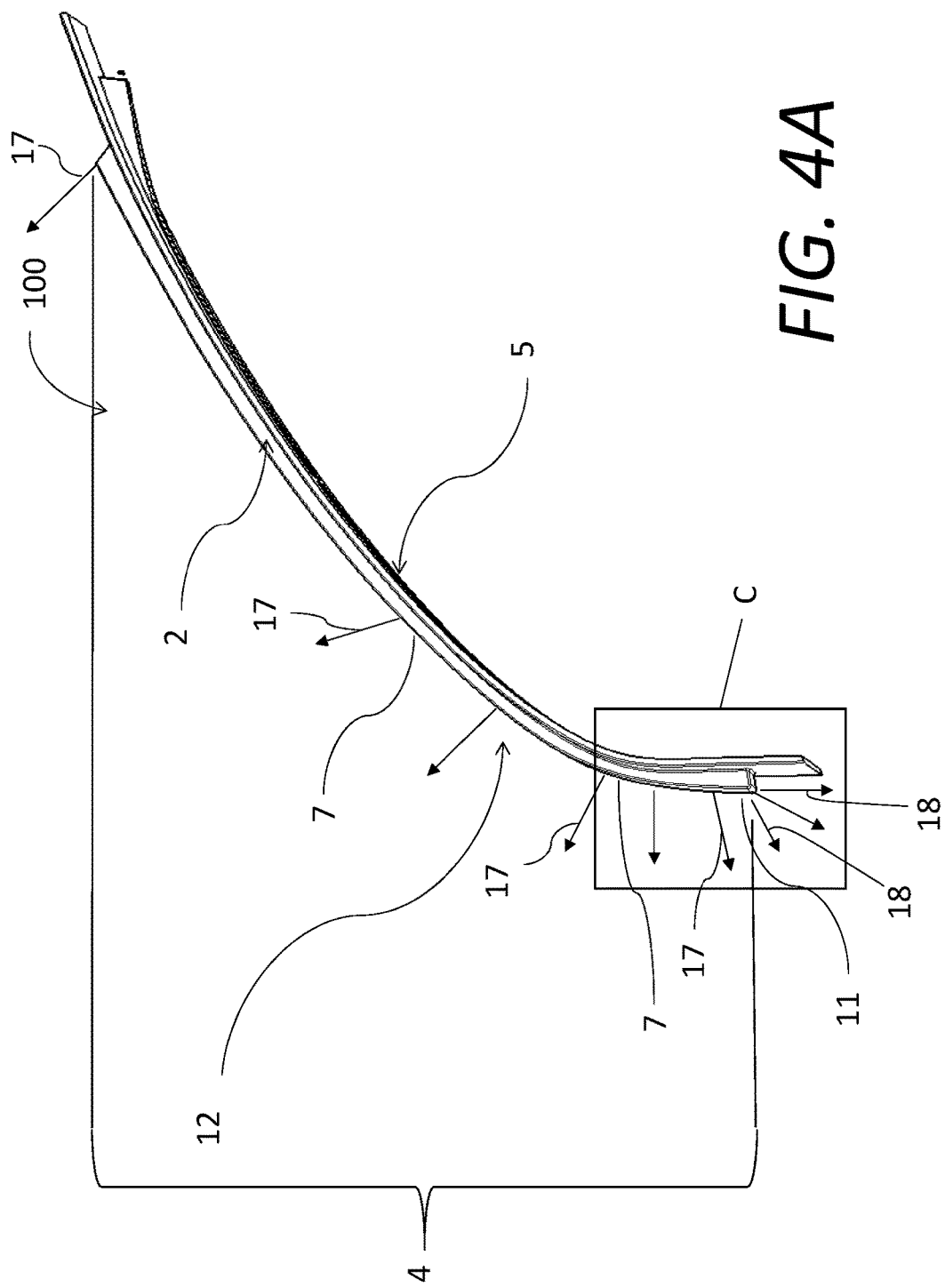
FIG. 4A is a perspective view of an embodiment of the light guide of FIG. 1, where an end of a longitudinal section is angled to direct light into photometric pattern in a different direction than the primary ejection direction from the prisms out of the primary exit face.
Figure 4B:
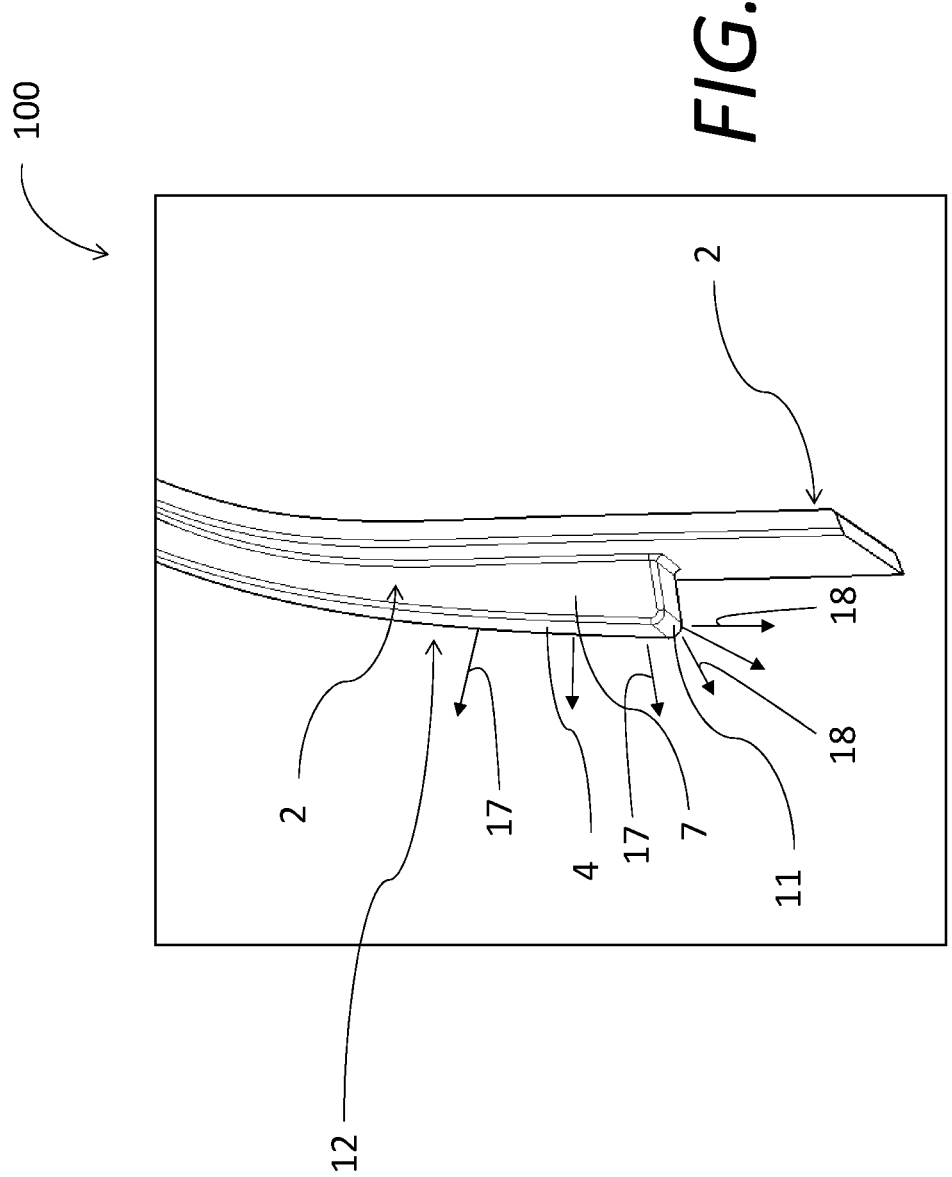
FIG. 4B is an enlargement of region C of FIG. 4A.

FIGS. 4A and 4B show the light guide 2, where the end 11 of longitudinal section is angled to direct light into a photometric pattern in a different direction than the primary ejection direction from the prisms 5 out of the primary exit face 4.

Figure 5:
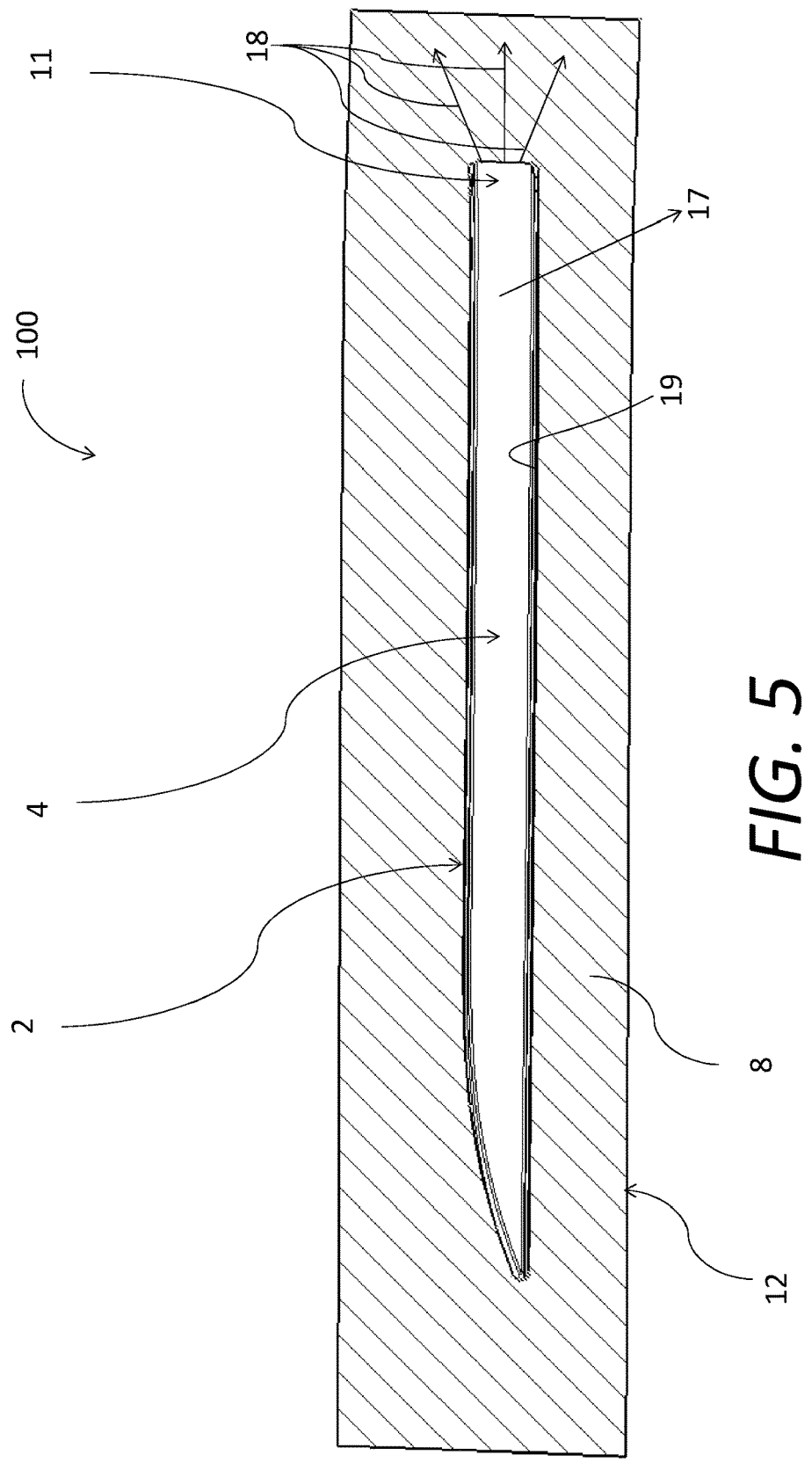
FIG. 5 is a front view of an the embodiment of a light device of FIG. 1 in a vehicular side mirror application as disclosed herein.

FIG. 5 shows a front view of an embodiment of a side mirror application 12. From this perspective the emitting exit face 4 of the light guide 2 is visible through the outer cover 8. The angled end 11 directs light rays 18 inwardly away from an observer of the exit face 4 and light rays 17 from this perspective.

Figure 6:
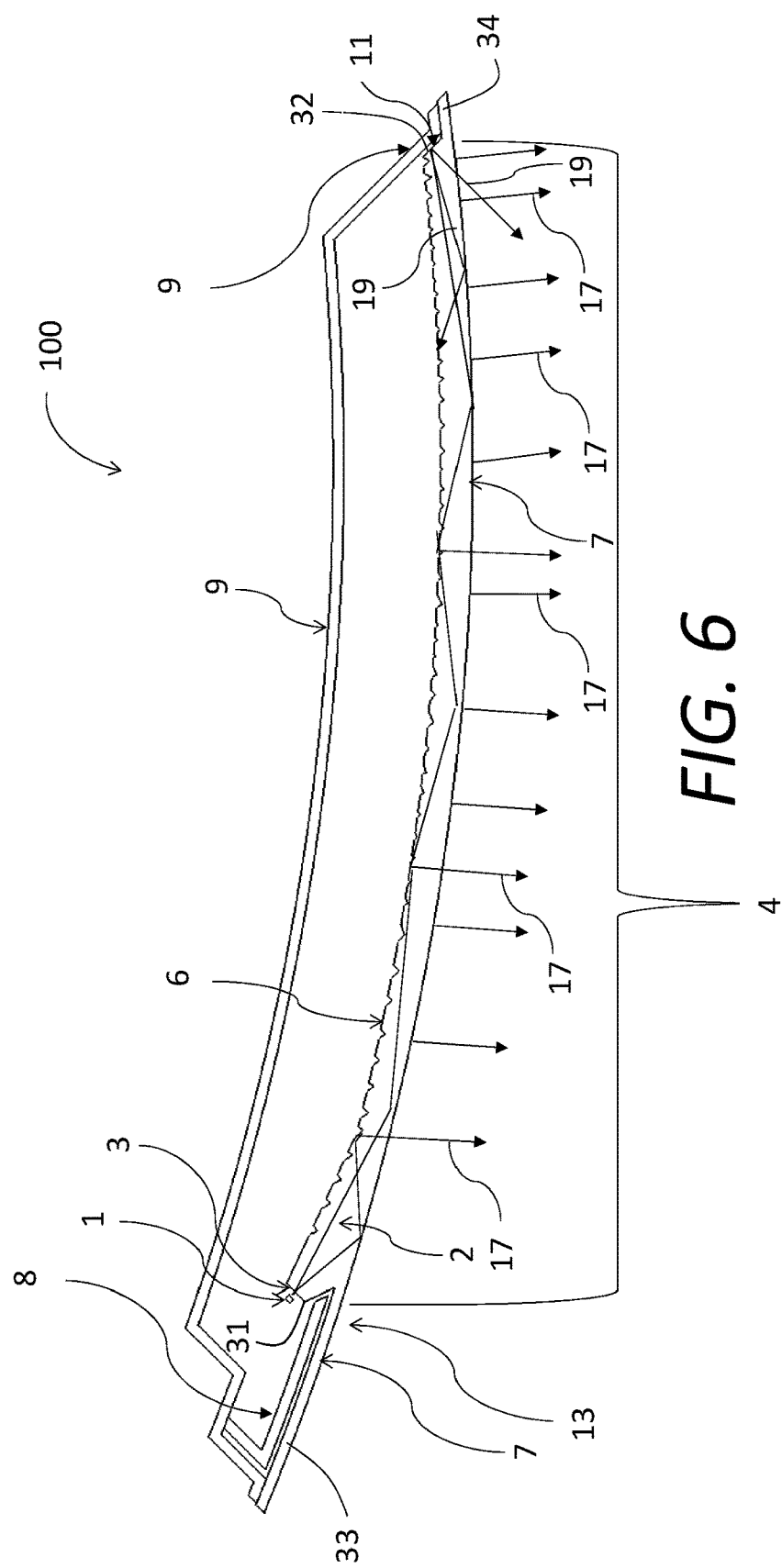
FIG. 6 is a longitudinal section view of a second embodiment of a light device as disclosed herein comprising a vehicular rear lamp in which an outer lens is flush with and extends beyond with the emitting exit surface of the light guide.

FIG. 6 shows a longitudinal section view of an alternate embodiment of a rear lamp 13 in which the outer lens 7 comprises and is flush with the light emitting exit surface 4 of the light guide 2. In this embodiment, the outer lens 7 has a surface area that is greater than and extends beyond the surface area of the light emitting exit surface 4 portion of the light guide 2. In the embodiment of FIGS. 6 and 7, the surface and surface area of the outer lens 7 extends or projects longitudinally beyond the light emitting exit surface 4 portion and opposing ends 31, 32 of the light guide 2 in the form of longitudinal projections 33, 34 as shown in FIG. 6. The surface and surface area of the outer lens 7 also extends or projects laterally upwardly and downwardly beyond the light emitting exit surface 4 portion and upper and lower projections 37, 38 as shown in FIG. 7. The projections 33, 34, 37, 38 may extend beyond the light emitting exit surface 4 by any desired amount or predetermined distance. The predetermined distance of projections 33, 34, 37, 38 may vary depending on the light device, and may be the same, or may each be different, in any combination, and the predetermined distance of one or more of projections 33, 34, 37, 38 may be zero as long as the predetermined distance of at least one is non-zero. In one embodiment, the exit surface 4 may comprises a smooth surface or a textured surface, or a combination thereof.

Referring again to FIG. 6, light rays 17 from light source 1, an LED in this arrangement, enters light guide 2 through in-coupling optics 3. Prismatic faces 5 on back side of the light guide 2. These prismatic faces 5 are disposed between total internal light reflecting areas 6 and direct light in light guide 2 through the exit face 4. In this arrangement the other backing structure elements 9 of the lamp are attached directly to the lens 7. In this arrangement the cover 8 only covers the light source 1 and leaves most of the lens 7 uncovered. The angled end 11 in this arrangement is used to send light rays 19 in a direction back towards the light source 1.

FIG. 7 shows a cross section view of arrangement of a rear lamp 13. Emitting exit face 4 is flush to the outer lens 7 and attaches directly to the other backing structure elements 9 of the lighting device or a vehicle. Any suitable method or mechanism for attachment such as fasteners and vibration welding and the other methods and fastener mechanisms described herein can be used to attach the other backing structure elements 9 and outer lens 7.

FIG. 1 and FIG. 5 show an embodiment of a for a side repeater 12 (sometimes referred to as a side mirror turn signal) light device 100 of motor vehicles comprising an elongated light guide 2 and a light source 1, LED in this arrangement, positioned in the entry part 3 of the light guide 2 for emitting the light beam into the light guide 2. The light guide 2 also comprises exit face 4 and a reflective inner face, which in one embodiment comprises prismatic face 5, oriented along its length. Exit face 4 constituting an exit surface for the light rays propagated in the light guide 2.

The reflective inner face 5, such as prismatic face 5, is disposed opposite to the exit face 4 and comprises a total internal reflection surface 6, which are therefore provided with light reflecting structure 40 or elements, such as prisms, and walls to send out uniform light rays 17 forward and outboard of the vehicle through the exit face 4 and light rays 18 outwardly in a direction different than the direction of light rays 17 through angled end 11 for legal functionality. In one embodiment, the light reflecting structure 40 or elements, such as prisms comprises a plurality of axially-spaced prism structures disposed along the light transmission portion. The light guide 2 is incorporated in the lens 7 with the light emitting face 4 disposed in an opening 19 in the opaque cover 8. By combining the lens 7 and light guide 2 the packaging space 10 between light guide 2 and other elements 9, including the interior mechanical mirror components in this arrangement, of lighting device 100 can be very thin. In one embodiment, the light guide 2 comprises a tapered portion 41, 43 that tapers axially and upwardly away from the inner face to the light emitting angled end and opposed end, respectively. In one embodiment, the light device 100 would reduce or eliminate the clearance space and combine the lens thicknesses giving a predetermined total thickness of the light device 100 from the face of the lens to rear of the backing structure of 4-10 mm, and in certain embodiments 4 mm to less than 8 mm, and 4 mm to 7.5 mm.

FIGS. 4A and 4B show a light device 100 comprising light guide 2 with angled end 11 to direct light rays 18 into a photometric pattern. Angled end 11 of light guide 2 is situated near to an opaque cover 8 to emit light in a direction different than the primary direction of emission of light rays 17. In one embodiment, the angled end 11 is chamfered or tapered to direct light in a desired direction and may have any suitable radius of curvature or other outwardly convex curved shape, and in one embodiment may include a radius of curvature of between 0.3 and 2 mm to adjust the light distribution in the secondary direction. The angled end 11 may also be used to reduce a visible gap between body side lamps and deck lid lamps by running light guides 2 all the way to the edge of the lens 7 surface.

FIGS. 6 and 7 show another embodiment of light device 100 as part of the outer lens of a rear lamp 13. The principle difference between the outer lens of a rear lamp 13 and the side mirror or repeater 12 is that in the outer lens of a rear lamp 13 the lens 7 and the emitting exit face 4 of the light guide 2 are flush and the lens 7 is attached directly to the other elements 9 of the lamp, comprising an exterior housing in this embodiment. The opaque cover 8 in this embodiment is only blocking direct (e.g. non-reflected) light rays from 1 and can be attached to the other elements 9 and/or lens 7. Additionally lens 7 in the outer lens of a rear lamp 13 is significantly flatter than the side mirror or repeater 12. Alternate embodiments can adjust the curvature of the outer lens 7 to accommodate the stylistic and mechanical requirements of the lamp design of light device 100.

For both the side mirror or repeater 12 and the outer lens of a rear lamp 13, the light guide 2 is made of a transparent polymer, polycarbonate (PC) or polymethyl methacrylate (PMMA), preferably of crystal quality due to the favorable optical and mechanical properties of these materials. Part of the light guide 2 is molded as part of the outer lens 7 comprising exit face 4 and angled exit face 11. The lens 7 is joined to the light guide 2 and together they form an integrally joined, optically transmissive unit, such that the light rays transmitted within the light guide 2 is transmitted internally directly through the lens. In one embodiment the lens 7 is integrally formed or molded with light guide 2 into a single, integral unit. In another embodiment, the lens 7 is insert molded or co-molded with light guide 2, or vice versa, to form a single, integral co-molded unit. In yet another embodiment, the lens 7 is formed separately from the light guide 2 and the two are joined together by an optically transmissive joint. The optically transmissive joint may be any suitable joint, including a glue joint with a refractive index matching glue, or various types of weld joints. The joined lens 7 and light guide 2 is a more optically efficient system than a two-part system as described in the background due to fewer Fresnel losses and eliminates an entire molded part and associated tooling.

Light source 1 is coupled to a control unit to provide desired predetermined light output characteristics of the output light spot and a predetermined output light area, wherein the light source 1, or plurality of sources 1, are alternately or jointly controllable by the control unit, and are configured to provide daily lighting and/or indicator light and/or rear contour light and/or front contour light.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A lighting device, comprising:
   a housing, the housing comprising an opening;
   a lens operably disposed in the opening, the lens having an outer viewable face and an opposed inner face, the lens comprising an integrally joined axially-extending light guide, the light guide comprising a light inlet end, an axially opposite end, a light exit face comprising a portion of the outer viewable face of the lens, and a light transmission portion, the light transmission portion comprising a light reflecting structure disposed on the inner reflecting face; and
   a light source, the light guide configured to receive light rays from the light source into the light inlet end, transmit the light rays via internal reflectance along the light transmission portion to the light reflecting structures where the light rays are reflected outwardly away from the lighting device in a principal direction through the exit face, wherein the light guide includes a first tapered portion proximate to the light inlet end and a second tapered portion proximate to the axially opposite end, with the first and second tapered portions tapering axially toward one another and inwardly toward the inner face.

2. The lighting device of claim 1, further comprising a backing structure, the backing structure spaced from the outer viewable face of the lens by a predetermined distance.

3. The lighting device of claim 1, wherein the predetermined distance is 4 mm to 10 mm.

4. The lighting device of claim 1, wherein the axially opposite end is a light emitting angled end, the light emitting angled end configured to emit light in a direction other than the principal direction.

5. The lighting device of claim 4, wherein the light emitting angled end comprises a beveled or chamfered edge.

6. The lighting device of claim 5, wherein the beveled or chamfered edge comprises a curved surface.

7. The lighting device of claim 6, wherein the curved surface has a radius of curvature that ranges from 0.3 mm to 2 mm.

8. The lighting device of claim 1, wherein the lens and light guide are formed from a transparent polymer comprising polycarbonate or poly(methyl methacrylate).

9. The lighting device of claim 1, wherein the light exit face portion of the outer viewable face comprises a smooth surface or a textured surface, or a combination thereof.

10. The lighting device of claim 1, wherein the cover comprises an opaque, translucent, or transparent cover.

11. The lighting device of claim 1, wherein the lens is curved or flat, and wherein the lens is clear or colored.

12. The lighting device of claim 1, wherein the lighting device comprises a vehicular exterior lighting device or interior lighting device.

13. The lighting device of claim 1, wherein the vehicle exterior lighting device comprises a side mirror light, a tail light, a parking light, a running light, or a head light.

\* \* \* \* \*